US005181123A

United States Patent [19]

Swank

[11] Patent Number: 5,181,123

[45] Date of Patent: Jan. 19, 1993

[54] CATHODE-RAY TUBE HAVING A SHRINKFIT IMPLOSION PROTECTION BAND WITH TENSION LIMITING MEANS

[75] Inventor: Harry R. Swank, Lancaster, Pa.

[73] Assignee: Thomson Consumer Electronics, Inc., Indianapolis, Ind.

[21] Appl. No.: 677,178

[22] Filed: Mar. 29, 1991

[51] Int. Cl.[5] .......... H04N 5/65

[52] U.S. Cl. .......... 358/246; 358/245

[58] Field of Search .......... 29/446, 447; 358/246, 358/245

[56] References Cited

U.S. PATENT DOCUMENTS

| | | | |
|---|---|---|---|
| 3,412,600 | 11/1968 | Powell et al. | 73/88 |
| 3,623,196 | 11/1971 | Bongenaar et al. | 29/25.13 |
| 3,626,093 | 12/1971 | Inglis | 178/7.8 |
| 4,701,802 | 10/1987 | Omae et al. | 358/246 |
| 5,036,577 | 8/1991 | Swank | 29/446 |
| 5,057,929 | 10/1991 | Hermann | 358/246 |

*Primary Examiner*—Stephen Brinich
*Assistant Examiner*—Ping Wong
*Attorney, Agent, or Firm*—Joseph S. Tripoli; Dennis H. Irlbeck; Vincent J. Coughlin, Jr.

[57] ABSTRACT

A cathode-ray tube comprises an evacuated envelope which includes a faceplate panel joined to a funnel. A shrinkfit implosion protection band of at least one strip of metal, having oppositely disposed ends, is secured together at a connective joint to form a loop with cold dimensions slightly smaller than the periphery of the panel prior to application of the band. The band has a given sectional area with at least one opening formed therethrough. The band is fitted around the periphery of the panel to apply a compressive force thereto, as a result of the tension of the band. The band is improved by providing at least one slot within the band and in communication with the opening, to reduce the sectional area of the band sufficiently to lower the tension of the band below the minimum design limit of the connective joint.

3 Claims, 2 Drawing Sheets

CATHODE-RAY TUBE HAVING A SHRINKFIT IMPLOSION PROTECTION BAND WITH TENSION LIMITING MEANS

This invention relates generally to cathode-ray tubes (CRT's) having implosion protection bands and, more particularly, to such tubes having shrinkfit implosion protection bands with tension limiting means formed therein.

BACKGROUND OF THE INVENTION

A cathode-ray tube is evacuated to a very low internal pressure and accordingly is subject to the possibility of implosion due to the stresses produced by atmospheric pressure acting on all surfaces of the tube. This problem has been addressed in the art by providing the CRT with an implosion protection band. Such a band is used to apply a compressive force to the sidewall of a faceplate panel of the CRT to redistribute some of the forces. The redistribution of the forces decreases the probability of an implosion of the tube by minimizing tension in the corners of the panel. An implosion protection band is also beneficial because it improves the impact resistance of the tube. Glass in compression is stronger than glass which is in tension and the band causes compression in panel areas which otherwise would be in tension. Additionally, in the event of an implosion, the redistributed stresses cause the imploding glass to be directed toward the back of the cabinet in which the tube is mounted, thereby substantially reducing the probability of someone in the vicinity of the imploding tube being injured.

An implosion protection band of the shrinkfit type typically is manufactured by forming a strip of steel into a loop having the same configuration as the faceplate panel to be protected and joining the two ends of the strip on one side of the band. In some instances, the band is made by joining two identical strips on two sides to form the loop. For both types of bands, the periphery of the loop is slightly smaller than the periphery of the faceplate panel. The loop is heated to approximately 300°to 500° C. and the coefficient of expansion of the material causes the loop to expand to dimensions permitting the loop to be slipped around the sides of the faceplate panel. As the band cools it shrinks and tightly surrounds the panel, thereby applying the necessary implosion protection compression to the faceplate panel. The compressive force can be accurately controlled by exceeding the yield point of the metal in the band.

The ends of the strips are permanently joined by either welding or crimping. In either event, because the strip is used to apply substantial pressure to the sidewall of the tube, it is essential that the connective joint, formed where the two ends are coupled together, be sufficiently strong to withstand the tension applied to it by the band. Typically, the connective joint is designed to withstand a minimum tension of 5000 pounds ( 2268 kg). Since the tension of the band is directly proportional to the yield strength of the material and its sectional area, any increase in the yield strength of the band material that is in excess of its maximum limit, will exert a tension on the connective joint in excess of its minimum design limit and may cause the joint to fail.

SUMMARY OF THE INVENTION

A cathode-ray tube comprises an evacuated envelope which includes a faceplate panel joined to a funnel. A shrinkfit implosion protection band of at least one strip of metal, having oppositely disposed ends, is secured together at a connective joint to form a loop with cold dimensions slightly smaller than the periphery of the panel prior to application of the band. The band has a given sectional area with at least one opening formed therethrough. The band is fitted around the periphery of the panel to apply a compressive force thereto, as a result of the tension of the band. The band is improved by providing means within the band and in communication with the opening for lowering the tension of the band below the minimum design limit of the connective joint.

DETAILED DESCRIPTION OF THE PREFERRED EMBODIMENT

Figure 1:
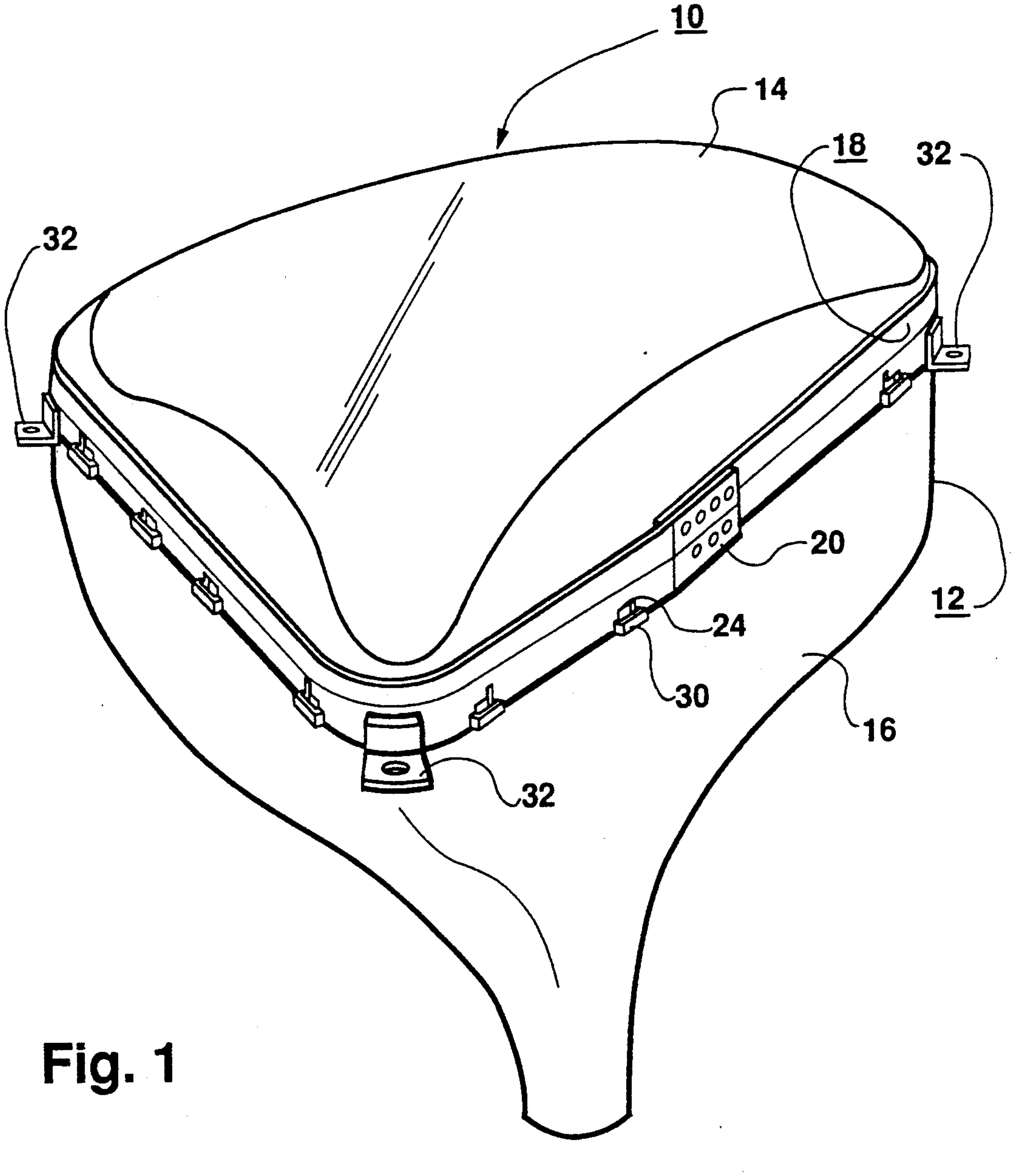
FIG. 1 is a perspective view of a CRT with a novel shrinkfit implosion protection band according to the present invention.
Figure 2:
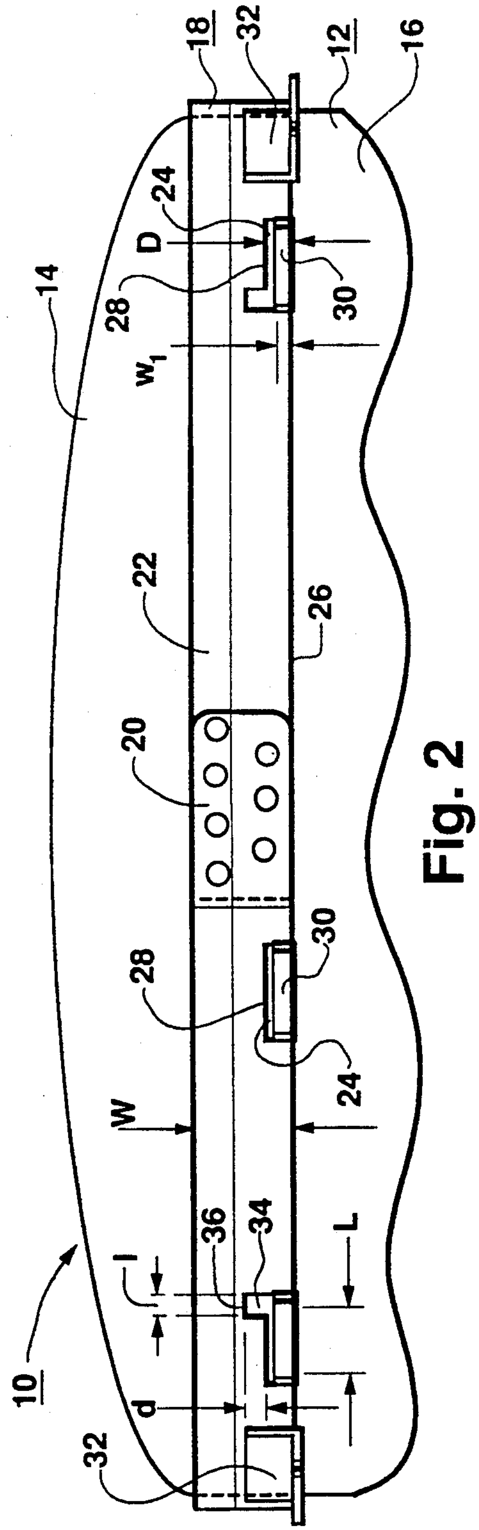
FIG. 2 is a front view of the tube and band of FIG. 1.

With respect to FIGS. 1 and 2, a CRT 10 comprises an evacuated envelope 12 having a faceplate panel 14 joined by a frit seal, not shown, to a funnel 16. An electron gun, also not shown, closes the opposite end of the funnel.

A shrinkfit implosion prevention band 18, in the form of a loop with cold dimensions slightly smaller than the periphery of the panel 14, is fitted around the panel by heating the band within the range of 300°to 500° C., to cause it to expand, and then allowing it to cool. The tension of the cooled band 18 applies a compressive force to the panel. The band 18 is formed by joining together the opposite ends of at least one steel strip to form a connective joint 20. In the present embodiment, the strip has an overall unfolded width of about 3.0 inches (76.2 mm) and a thickness within the range of 0.042 to 0.045 inch (1.07 to 14 mm). An inch (25.4 mm) of one edge 22 of the strip is folded over to provide a double thickness of material on the faceplate-side of the band and to create a band 18 with an operable width, W, of about 2 inches (50.8 mm). A plurality of openings 24 are formed by, e.g., lancing the band 18 adjacent to the opposite unfolded edge 26. Each of the openings 24 has a base 28 spaced a distance, D, of about 0.375 inches (9.5 mm), from the edge 26. A narrow strip of the band material bridges the opening 24. The strip is formed out of the plane of the band 18 to define a clip-receiving retainer 30. Typically, the retainer 30 has a width, $w_1$, of about 0.184 inch (4.67 mm) and an effective length, L, of about 0.78 inch (19.81 mm), which is slightly less than the length of the base 28. A mounting lug 32 is attached to the band 18 at each of the corners. As described so far, the band 18 is conventional.

A problem with the conventional band 18 is that variations in the yield strength or the thickness of the material, above the maximum allowable values, could result in a tension on the connective joint 20 in excess of its minimum design limit of 5000 pounds, resulting in a failure of the joint. The minimum design limit is the minimum tension at which the joint 20 will fail. The steel band material has a specified yield strength, Y, in the range of 37,000 to 42,000 psi (26.0 to 29.5 $Kg/mm^2$). The maximum thickness, t, of the material is 0.045 inches (1.14 mm). The effective width W' of the band is defined as the overall width, 3.00 inches (76.2 mm) less the depth of the opening 24 or 0.375 inches (9.5 mm), or 2.625 inches(66.7 mm). The maximum tension on the joint 20, for material having a yield strength of 42,000 psi (29.5 $Kg/mm^2$), is $$T_{max} = Y \times W' \times t$$

$$T_{max} = 42{,}000\ psi \times 2.625\ in \times 0.045\ in\ (29.5\ Kg/mm^2 \times 66.7\ mm \times 1.14\ mm)$$

$$T_{max} = 4{,}961.25 \text{ pounds}(2243 \text{ Kg}).$$

The tension on the joint 20 is below the minimum design limit and the joint will hold. However, tests have shown that, after forming and working, the steel strip has a yield strength as high as 47,000 psi(33.0 $Kg/mm^2$). The resulting tension on the joint 20 for this material is $T_1 = 47{,}000$ psi $\times 2.625\ in \times 0.045\ in$ (33.0 $Kg/mm^2 \times 66.7\ mm$ $$T_1 = 5551.88 \text{ pounds}(2509 \text{ Kg}).$$

This latter value of tension may cause the joint 20 to fail.

To prevent failure of the joint 20, while still providing sufficient compressive force on the panel 18, the two openings 24 adjacent to each of the lugs 32 at the corners of the band 18 are modified to include a slot 34 which communicates with the openings 24. Each of the slots 34 has a slot base 36 with a length, 1, of about 0.25 inch (6.35 mm) and a depth, d, of about 0.30 inchs (7.62 mm). The depth, d, of the slot 34, in combination with the depth, D, of the opening 24, increases the effective overall depth to about 0.675inch (17.15 mm), thereby reducing the effective folded band width to 2.325 in(59.1 mm). The resulting force on the joint 20, for steel strip having a thickness of 0.45 inch (1.14 mm) and a maximum yield strength of 47,000 psi(33.0 $Kg/mm^2$), is then $$T_2 = 47{,}000\ psi \times 2.325\ in \times 0.045 \text{ in } (33.0\ Kg/mm^2 \times 59.1\ mm \times 1.14\ mm)$$

$$T_2 = 4917.38 \text{ pounds}(2223 \text{ Kg})$$

Thus, even in the worst case situation of a maximum material thickness of 0.045 inch (1.14 mm), and a yield strength of 47,000 psi(33.0 $Kg/mm^2$), the tension on the joint 20 will not exceed the minimum design limit of 5000 pounds(2268 Kg)..

Figure 3:
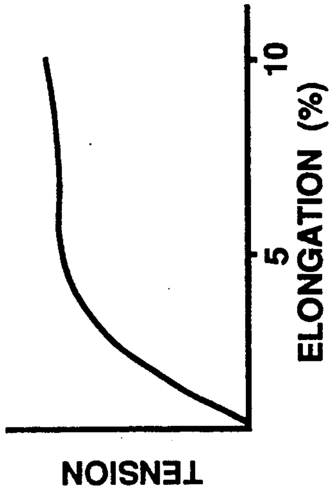
FIG. 3 is a typical elongation curve for a material from which the band can be made.

Prior to fitting the band 18 on the tube 10, the band is stretched to slightly exceed the elastic limit of the metal, thereby causing the band to yield and to apply a known, predictable tension on the tube. This is evident from FIG. 3, which shows that the tension remains substantially constant after approximately a 5% elongation. The band 18 is stretched by the method described in U.S. Pat. No. 5,036,577, issued on Aug. 6, 199 1 to H. R. Swank.

Figure 4:
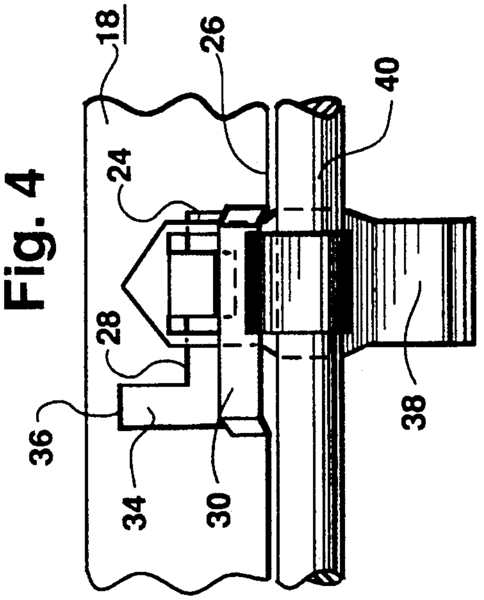
FIG. 4 is an enlarged view of a segment of the novel band showing an opening and slot with a degaussing coil-retaining clip disposed within the opening.

A segment of the novel band 18 is shown in FIG. 4. A clip 38 is disposed within the opening 24 in the band 18. The clip 38 engages the clip-receiving retainer 30 and accurately locates a degaussing coil 40 relative to the tube, not shown. The slot 34 does not interfere with either the location or retention of the clip 38. By incorporating the slot 34 and the opening 24 in each of the eight corner-adjacent positions, economy is achieved by forming both the opening and the slot in a single operation. Additionally, since the tension on the band 18 is greater near the corners than elsewhere, the greatest protection for the joint 20 is achieved by locating the slots 34 within the eight corner-adjacent openings 24, so that the tension is substantially uniformly distributed to each of the four corners of the band.

What is claimed is:

1. In a cathode-ray tube comprising an evacuated envelope having a faceplate panel joined to a funnel and a shrinkfit implosion protection band of at least one strip of metal having opposite ends secured together at a connective joint, said joint having a minimum design limit which if exceeded, will cause failure of said joint, said band being formed into a loop with cold dimensions slightly smaller than the periphery of said panel prior to application of said band, said band having a given sectional area with at least one opening formed therein, said opening having a base spaced from an edge of said band, said opening being provided to accommodate a clip, said band being fitted around the periphery of said panel to apply a compressive force thereto as a result of the tension of said band, the improvement wherein said band includes a slot in communication with said opening for lowering the tension of said band below the minimum design limit of said connective joint, said slot having a base with a dimension smaller than a dimension of said base of said opening, said tube-related component being located and retained within said opening without interference from said slot.

2. In a cathode-ray tube comprising an evacuated envelope having a faceplate panel joined to a funnel and a shrinkfit implosion protection band of at least one strip of metal having opposite ends secured together to form a connective joint, said joint having a minimum design limit which, if exceeded, will cause failure of said joint, said band being formed into a rectangular loop with cold dimensions slightly smaller than the periphery of said panel prior to application of said band, said band having a given sectional area with at least eight openings formed therein, two of said openings being adjacent to each of the corners of said band, said openings having a base spaced from an edge of said band, said openings being provided to accommodate a clip said band being fitted around the periphery of said panel to apply a compressive force thereto as a result of the tension of said band, the improvement wherein eight slots are formed within said band, each of said slots communicating with a different one of said openings, each of said slots having a base with a dimension smaller than the dimensions of a base of said openings, said slots reducing said sectional area of said band sufficiently to lower the tension of said band below the minimum design limit of said connective joint, said tube-related component being located and retained within said opening without interference from said slots.

3. In a cathode-ray tube comprising an evacuated envelope having a faceplate panel joined to a funnel and a shrinkfit implosion protection band of at least one strip of metal having opposite ends secured together to a connective joint, said joint having a minimum design limit which, if exceeded, will cause failure of said joint, and said band being formed into a loop with cold dimensions slightly smaller than the periphery of said panel prior to application of said band, said band having a given sectional area with a plurality of openings formed therein, each of said openings having a base spaced from an edge of said band, each of said openings accommodating a clip which accurately locates a degaussing coil, said band being fitted around the periphery of said panel to apply a compressive force thereto as a result of the tension of said band, the improvement wherein said band includes a slot in communication with each of said openings for lowering said tension of said band below the minimum design limit of said connective joint, each of said slots having a base with a dimension smaller than a dimension of said base of said corresponding openings, said clips being located and retained within said openings without interference from said slots.

* * * * *

UNITED STATES PATENT AND TRADEMARK OFFICE

CERTIFICATE OF CORRECTION

PATENT NO. : 5,181,123

DATED : Jan. 19, 1993

INVENTOR(S) : Harry Robert Swank

It is certified that error appears in the above-identified patent and that said Letters Patent is hereby corrected as shown below:

Col. 2, line 48,
change "14 mm" to --1.14mm--.

Col. 3, line 9,
after "24" add --,-- and after "0.375" change "inches" --inch--.

Col. 3, line 38,
after "0.30" change "inchs" to --inch--.

Col. 4, lines 33-34,
change "tube-related component" to --clip--.

UNITED STATES PATENT AND TRADEMARK OFFICE

CERTIFICATE OF CORRECTION

PATENT NO. : 5,181,123

DATED : Jan. 19, 1993

INVENTOR(S) : Harry Robert Swank

It is certified that error appears in the above-identified patent and that said Letters Patent is hereby corrected as shown below:

Col. 4, lines 60-61, change "tube-related component"

to --clip--.

Signed and Sealed this

Thirtieth Day of November, 1993

Attest:

BRUCE LEHMAN

*Attesting Officer*

*Commissioner of Patents and Trademarks*